United States Patent
Barrett

(10) Patent No.: US 11,822,422 B2
(45) Date of Patent: Nov. 21, 2023

(54) REMOTE DISPLAY FAILURE DETECTION

(71) Applicant: ORACLE INTERNATIONAL CORPORATION, Redwood Shores, CA (US)

(72) Inventor: Douglas J. Barrett, Eldersburg, MD (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 402 days.

(21) Appl. No.: 16/783,694

(22) Filed: Feb. 6, 2020

(65) Prior Publication Data

US 2021/0248028 A1 Aug. 12, 2021

(51) Int. Cl.
| | |
|---|---|
| G09G 3/36 | (2006.01) |
| G06F 11/07 | (2006.01) |
| G02F 1/13 | (2006.01) |
| G02F 1/13357 | (2006.01) |
| G09G 3/00 | (2006.01) |
| G02F 1/1333 | (2006.01) |
| G02F 1/1335 | (2006.01) |

(52) U.S. Cl.
CPC ........ *G06F 11/0793* (2013.01); *G02F 1/1309* (2013.01); *G02F 1/13338* (2013.01); *G02F 1/133604* (2013.01); *G09G 3/006* (2013.01); *G02F 1/133612* (2021.01)

(58) Field of Classification Search
CPC ............... G06F 11/0793; G02F 1/1309; G02F 1/13338; G02F 1/133604; G02F 1/133612; G09G 3/006; G09G 2330/04–12
See application file for complete search history.

(56) References Cited

U.S. PATENT DOCUMENTS

| | | | |
|---|---|---|---|
| 6,825,828 B2 | 11/2004 | Burke et al. | |
| 7,548,229 B2 | 6/2009 | Oh | |
| 2007/0022016 A1 | 1/2007 | Steres et al. | |
| 2008/0062115 A1 | 3/2008 | Brown | |
| 2009/0167675 A1* | 7/2009 | Park | G09G 3/3406 349/116 |
| 2009/0243993 A1* | 10/2009 | Kuga | G02F 1/13318 349/116 |
| 2010/0001978 A1* | 1/2010 | Lynch | G06F 3/042 345/175 |

(Continued)

FOREIGN PATENT DOCUMENTS

| | | |
|---|---|---|
| JP | 2016224517 A | 12/2016 |
| WO | 2004061739 A1 | 7/2004 |

OTHER PUBLICATIONS

Lee et al., "Automatic Detection of Region-Mura Defect in TFT-LCD", Dec. 23, 2013, https://www.researchgate.net/publication/279564481_Automatic_detection_of_region-mura_defect_in_TFT-LCD.

(Continued)

*Primary Examiner* — Sanghyuk Park
(74) *Attorney, Agent, or Firm* — Potomac Law Group, PLLC

(57) ABSTRACT

One embodiment is a remote display system. Embodiments include a liquid-crystal display ("LCD"), an outer surface that forms a gap between the outer surface and the LCD, a light sensor disposed within the gap and covering a portion of the LCD, and a flexible printed circuit board ("PCB") that couples the light sensor to a server.

20 Claims, 8 Drawing Sheets

(56) References Cited

U.S. PATENT DOCUMENTS

| | | |
|---|---|---|
| 2011/0027918 A1* | 2/2011 | Tanaka ................ H01L 51/5278 356/237.1 |
| 2011/0248969 A1 | 10/2011 | Choi et al. |
| 2013/0106813 A1* | 5/2013 | Hotelling .............. G06F 1/1626 345/207 |
| 2014/0085281 A1* | 3/2014 | Lim ..................... G09G 3/3266 345/206 |
| 2015/0254046 A1 | 9/2015 | Hall |
| 2017/0301046 A1 | 10/2017 | Theobald |
| 2018/0332261 A1* | 11/2018 | Zhang ................. H04N 1/6044 |

OTHER PUBLICATIONS

Lu et al., "A Defect Inspection Algorithm For LCD Touch Screen", ICISE '09: Proceedings of the 2009 First IEEE International Conference on Information Science and Engineering Dec. 2009 pp. 1031-1034, https://dl.acm.org/citation.cfm?id=1728266.

Sultania, "Monitoring and Failure Recovery of Cloud-Managed Digital Signage", Master's Thesis (30 ECTS), Tartu 2017, Https://comserv.cs.ut.ee/home/files/Sultania_ComputerScience_2017.pdf?study=ATILoputoo&reference=2776E3D940B969AF1332743BD8DA9D3099039AF9; last downloaded Oct. 7, 2019.

Unknown, "Order Confirmation System Setup Guide", micros Systems, Inc., May 2010.

\* cited by examiner

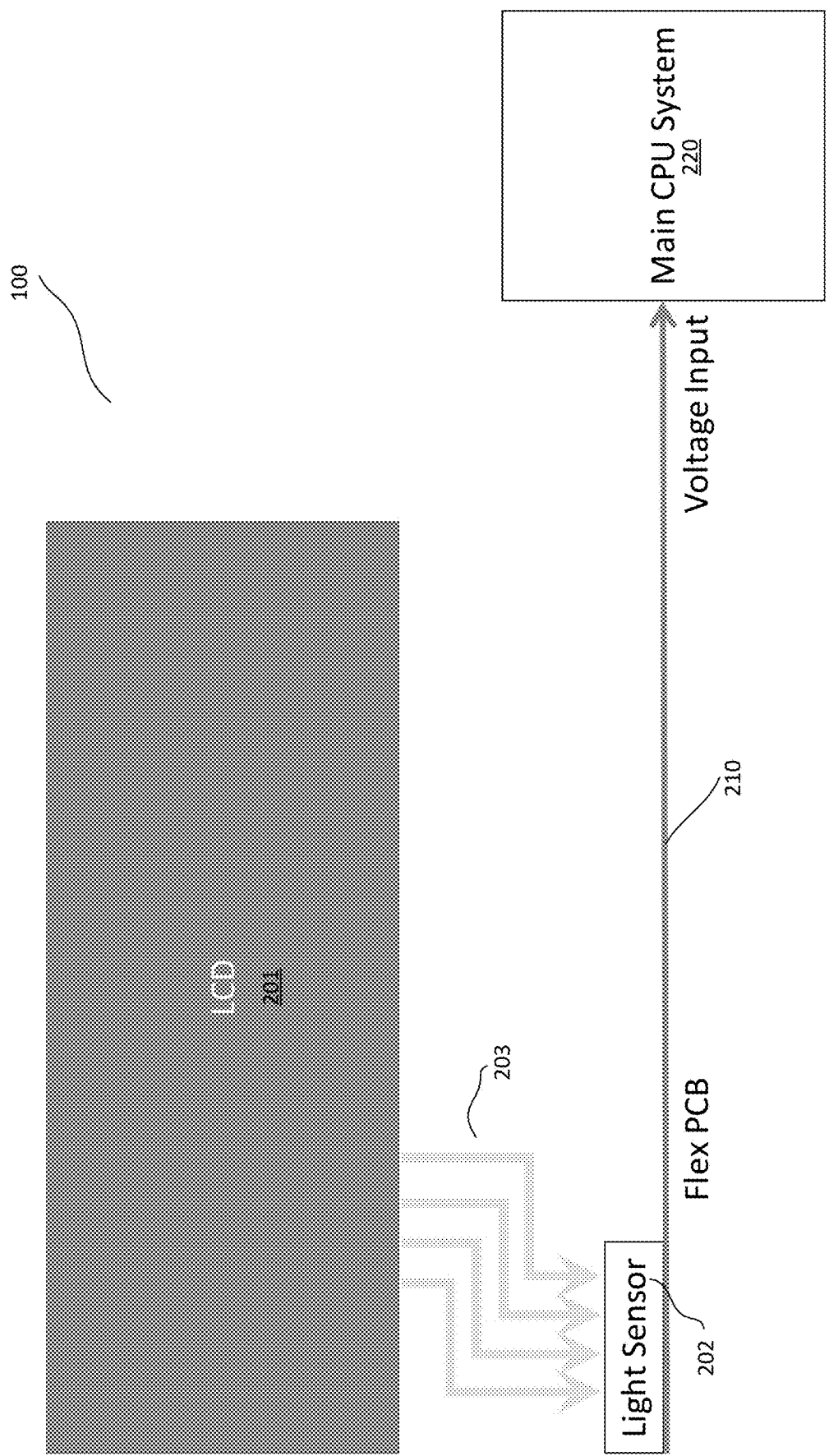

REMOTE DISPLAY FAILURE DETECTION

FIELD

One embodiment is directed generally to an electronic display, and in particular to an electronic display that includes remote failure detection.

BACKGROUND INFORMATION

Many organizations utilize electronic display systems to display information. For example, relatively large display systems are deployed at airports for providing flight information and at drive-through lanes of restaurants for displaying menus. Some display systems also include input means such as touchscreens.

However, as is the case with airports and drive-through lanes, and also when part of a larger, multi-display system, some electronic display systems are remote from the primary operator. Therefore, it can be difficult for the operator or application software to determine if the display system is functioning properly.

One relatively common "solution" for a malfunctioning electronic display in a drive-through environment is that a drive-through customer will read off static menus and be able to order without notifying the restaurant operator that the display system has failed. However, this example is not really a solution because a restaurant operator may continue to operate with the failed display using the static menu for a long time before the operator realizes that the display system had failed. In the case of a multi-display system, if it can be determined that display has failed, the application can adjust the outputs to the various displays to accommodate the failure, and adjust the display data which is to be sent to the still-functioning displays (i.e., a roll-over).

SUMMARY

One embodiment is a remote display system. Embodiments include a liquid-crystal display ("LCD"), an outer surface that forms a gap between the outer surface and the LCD, a light sensor disposed within the gap and covering a portion of the LCD, and a flexible printed circuit board ("PCB") that couples the light sensor to a server or local processor.

BRIEF DESCRIPTION OF THE DRAWINGS

Further embodiments, details, advantages, and modifications will become apparent from the following detailed description of the embodiments, which is to be taken in conjunction with the accompanying drawings.

FIG. 2 is a block diagram of a portion of the remote display system in accordance to embodiments of the invention.

DETAILED DESCRIPTION

One embodiment is a touchscreen-based display system that includes a sensor for detecting a "heartbeat" of the system. The detection, or lack of detection of the heartbeat, provides a status of the display system. The sensor is coupled to a flexible printed circuit board ("PCB") and is monitored by a host processor. The design of the sensor in combination with the flexible PCB allows the sensor to be inserted in the reduced spacing between the touchscreen and the display and minimizes the amount of the display that is obscured.

Reference will now be made in detail to the embodiments of the present disclosure, examples of which are illustrated in the accompanying drawings. In the following detailed description, numerous specific details are set forth in order to provide a thorough understanding of the present disclosure. However, it will be apparent to one of ordinary skill in the art that the present disclosure may be practiced without these specific details. In other instances, well-known methods, procedures, components, and circuits have not been described in detail so as not to unnecessarily obscure aspects of the embodiments. Wherever possible, like reference numbers will be used for like elements.

Figure 1:
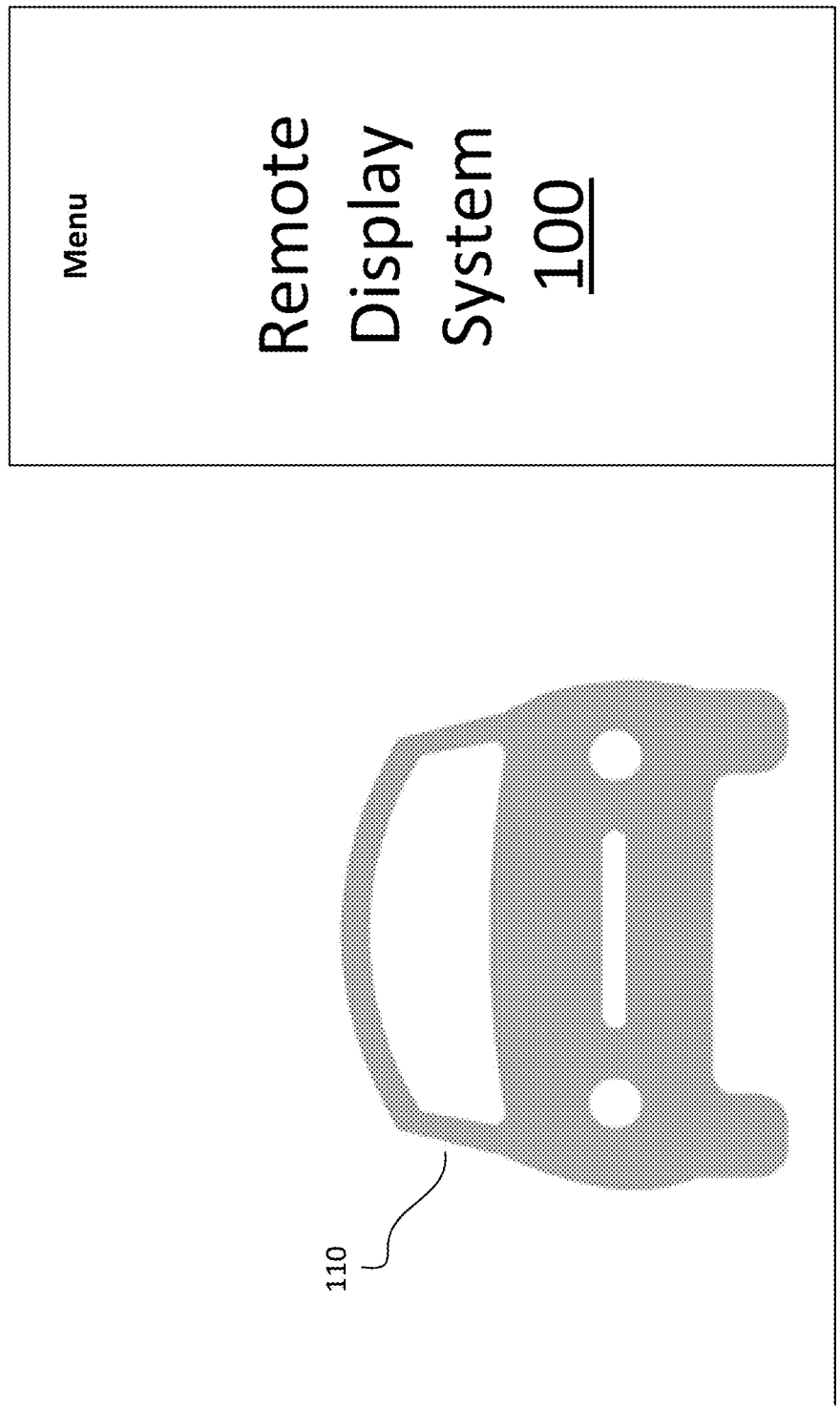
FIG. 1 illustrates a drive-through that uses a remote display system in accordance to embodiments.

FIG. 1 illustrates a drive-through that uses a remote display system 100 in accordance to embodiments. A vehicle 110 in a drive-through lane pauses in front of remote display system 100 to place an order. Remote display system 100 (or "display 100") includes one or more individual displays (e.g., a liquid-crystal display ("LCD")) that displays information such as menus and item costs. System 100 can also include a speaker and microphone to communicate with a user, and a computer processor and related elements, either local to system 100 or in remote communication to system 100, to implement the heartbeat functionality disclosed below. Because the order is typically placed in a location before the restaurant window, system 100 is generally not easily viewed by any restaurant workers or other operators, and therefore there is a need to remotely detect any failures of system 100. Further, although shown in a restaurant drive-through environment in FIG. 1, remote display system 100 can be used in any environment where a remote detection of a failure or defect is desirable.

FIG. 2 is a block diagram of a portion of remote display system 100 in accordance to embodiments of the invention. System 100 includes an LCD display 201, and a light sensor 202 that senses light 203 emitted from LCD display 201. Light sensor 202 is coupled to a flexible printed circuit board ("PCB") 210, which provides voltage input (in response to sensing of light) to a main central processing unit ("CPU") system/server 220. Server 220 is also coupled to LCD display 201 in order to generate a heartbeat cursor on LCD 201 as disclosed below. Light sensor 202, flexible PCB 201 and server 220 (or other form of monitoring functionality) form an optical heartbeat monitor that determines if LCD display 201 is functioning or has failed.

Figure 3A:
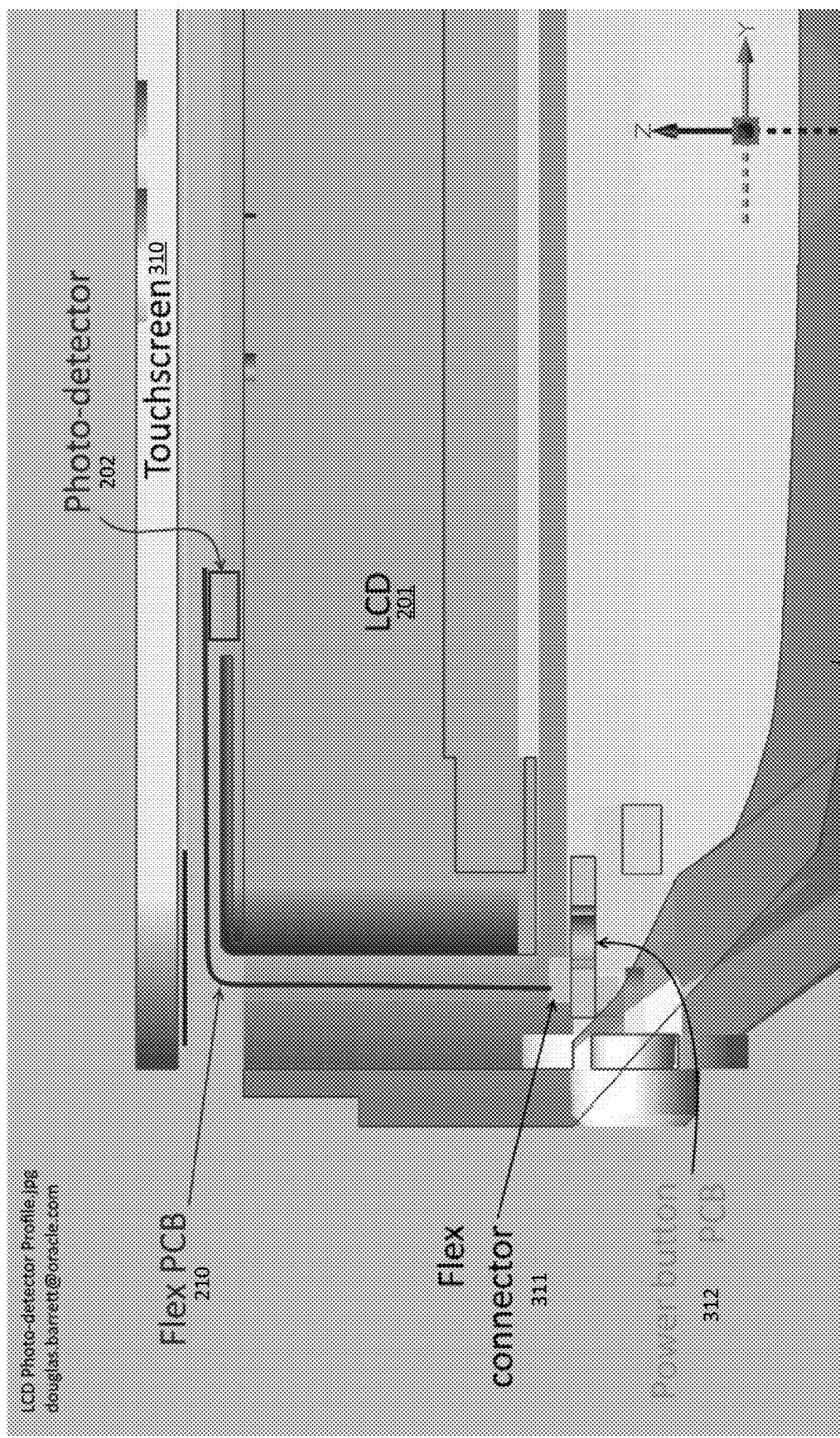
FIG. 3A is a cross-sectional view of a portion of the remote display system in accordance to embodiments of the invention.

FIG. 3A is a cross-sectional view of a portion of remote display system 100 in accordance to embodiments of the invention. As shown in FIG. 3A, light sensor 202 (also referred to as photo-detector 202) covers a portion of LCD 201 and is placed/disposed between LCD 201 and a touchscreen 310. In other embodiments, outer surface 310 may not be a touchscreen (e.g., protective glass) but can be any material and is approximately parallel to LCD 201 and forms a gap. Flexible PCB 210 is coupled to a flex connector 311, which is coupled to a power button PCB 312 (or any other type of power source or any other link to main CPU system 220). Not shown are communication elements that allow the output of light sensor 202 to be communicated, either wired or wirelessly, to server 220. As shown, flexible PCB 210 wraps around the side of LCD 201 and is coupled at the side of LCD 201 opposite the front side.

Flexible PCB 210 provides a suitable substrate for mounting light sensor 202. Alternative methods such as using wires would require a larger light sensor device would generally be more costly to build, as it would probably require a human soldering operator, as opposed to an automated pick-and-place process and a mass production soldering process. Further, flexible PCB 210 provides a preformed assembly that makes for an easy orientation of light sensor 202 towards LCD 201 when installed within LCD display system.

Figure 3B:
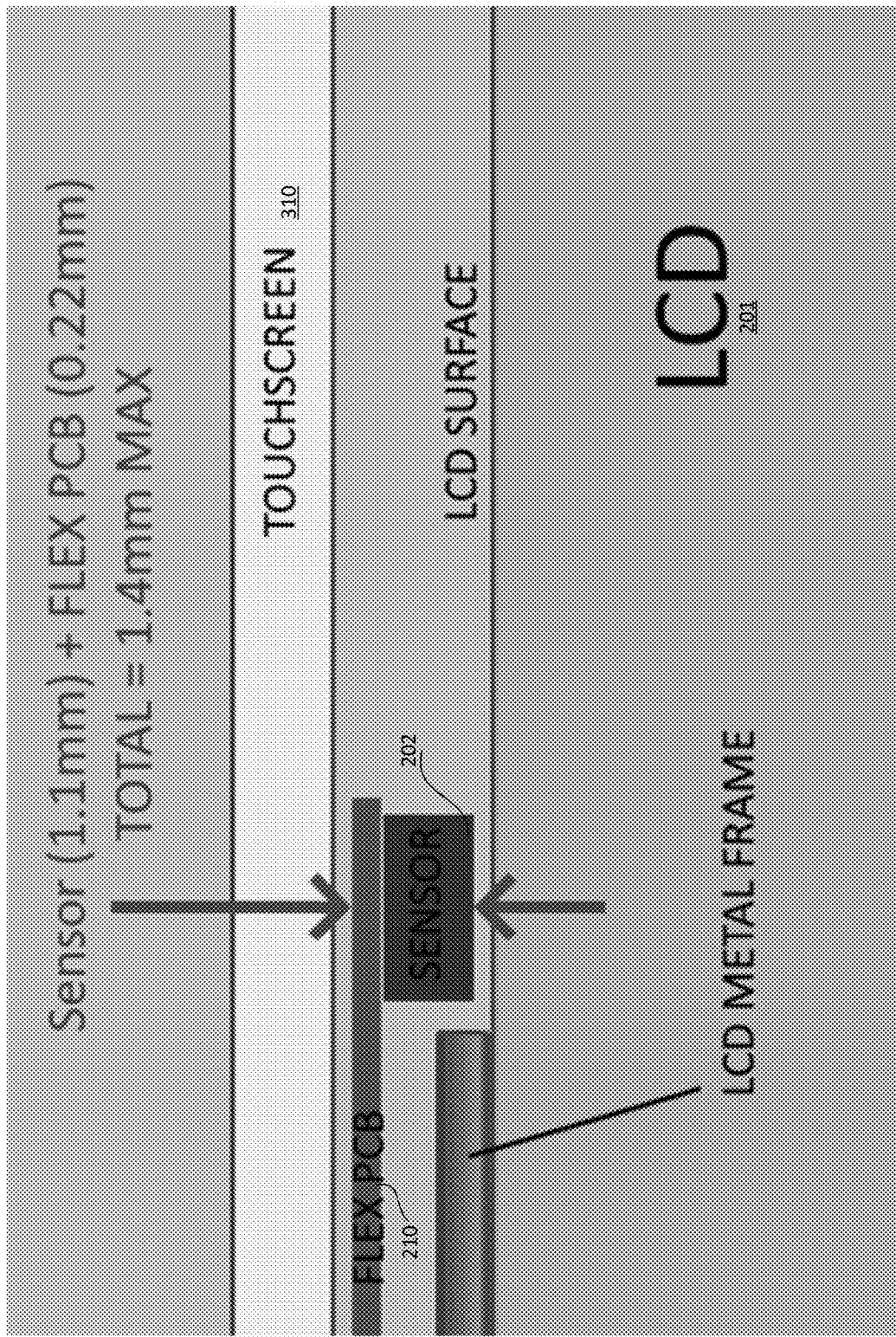
FIG. 3B is another cross-sectional view of a portion of the remote display system in accordance to embodiments of the invention.

FIG. 3B is another cross-sectional view of a portion of remote display system 100 in accordance to embodiments of the invention. As shown in FIG. 3B, and as is known in the relevant touchscreen technology, the gap between LCD 201 and touchscreen 310 is relatively small. The stack height (height of sensor 202 plus flex PCB 210) shown in the embodiment of FIG. 3B is approximately 1.3-1.4 mm, which takes up most of the space between the LCD surface and touchscreen 310. However, some known remote display failure detection systems were not designed for a touchscreen and instead utilized the much larger gap between an LCD and outer glass (i.e., non touchscreen glass). In these known systems, a light sensor is generally directly mounted on a fixed rigid PCB, which causes that stack height of the light sensor on top of the PCB to be relatively large, and causes the PCB to block an area of the LCD that is larger than the size of the light sensor itself. For example, in one known remote detection implementation that uses a PCB (Order Confirmation System from Micros Systems Inc., Part Number: 10016-172), the clearance between an LCD screen and glass cover (non-touchscreen) is approximately 15 mm, and the stack height of a PCB and sensor is approximately 9.4 mm.

In contrast, in embodiments, the use of the flexible PCB 210, which wraps around LCD 201, allows the stack height of light sensor 202 alone (i.e., without having to be stacked onto a rigid PCB) to be minimized to fit into the narrow gap between LCD 201 and touchscreen 310. In addition, the size of the light sensor 202 alone minimizes the amount of pixels blocked on LCD 201.

In one embodiment, light sensor 202 is implemented using the "Ambient Light Sensor" from Vishay Semiconductors (PN #TEMT6000X01). Light sensor 202 is mounted on a standard single-sided flex PCB 210 which is IPC 6013 Type 1 compliant. In this embodiment, the size of light sensor 202 is 2×2 mm. Including the mounting distance to the edge, in embodiments approximately a 3×3 mm area of LCD display 201 will be blocked.

Figure 4:
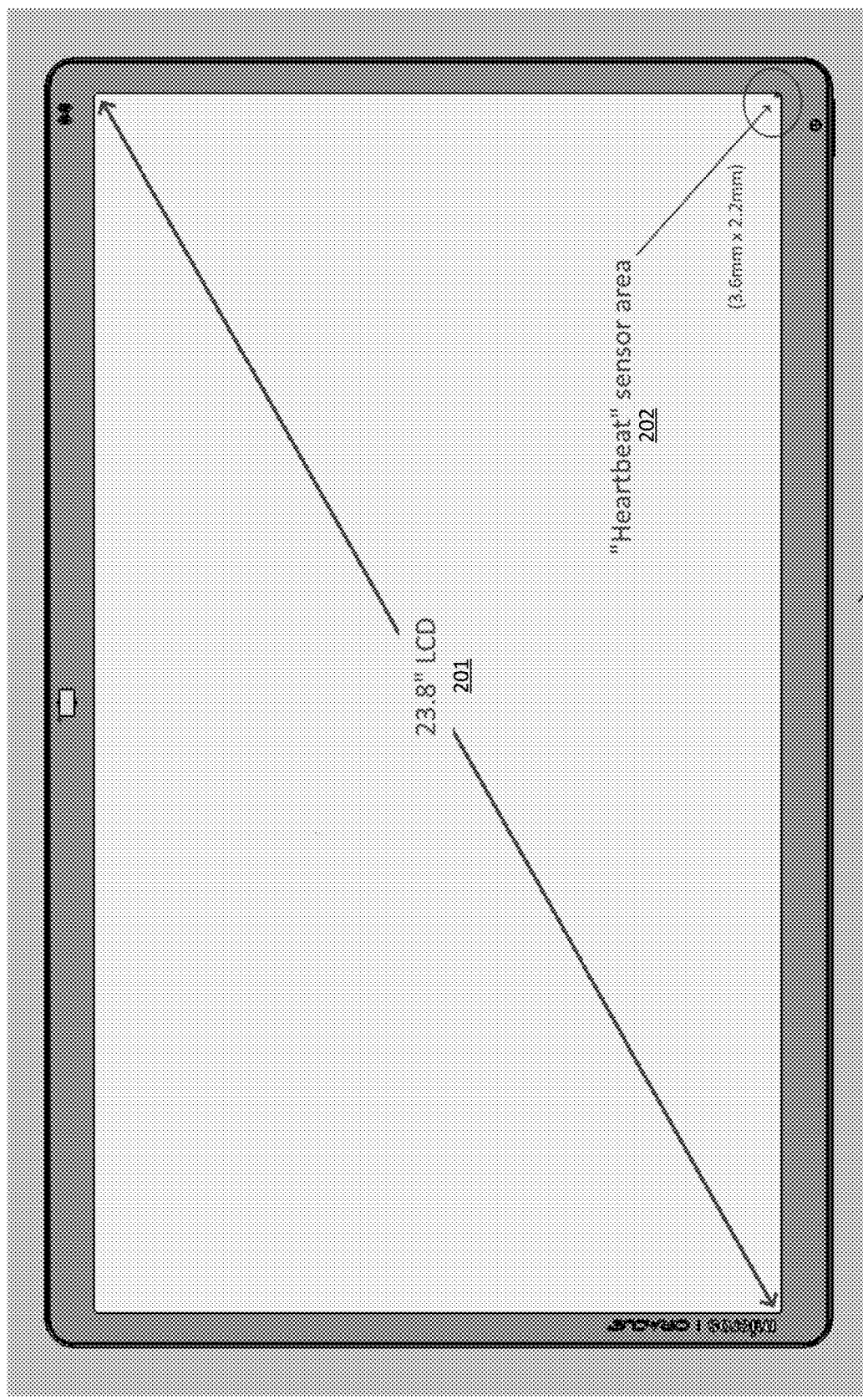
FIG. 4 is a representation of a portion of the remote display system in accordance to embodiments of the invention.

FIG. 4 is a representation of a portion of remote display system 100 in accordance to embodiments of the invention. FIG. 4 illustrates a positioning of light sensor 202 on LCD display 201 and an approximate portion that LCD display 201 covers/obscures LCD display 201. In the embodiment of FIG. 4, light sensor 202 is positioned on the bottom right-hand corner of display 201, but in other embodiments it can be positioned elsewhere.

In order to determine that LCD display 201 is still functioning, embodiments execute two basic functions: (1) heartbeat drive out and (2) heartbeat monitor. For the heartbeat drive out functionality, embodiments drive the designated pixel area in the bottom right-hand corner (or other applicable portion of LCD display 201) with an alternating black-white periodic signal (i.e., the "heartbeat" or "heartbeat cursor"). In embodiments, the heartbeat cursor is always on top of all display data, including screensavers. Embodiments also take into account when the backlight of LCD display 201 is disabled by the heartbeat driver software utilizing standard operating system driver functions to monitor when the LCD is not enabled.

The heartbeat is driven by a customized graphics driver on the host CPU. The use of a customized graphics driver provides for an "always on top" functionality of the heartbeat cursor, and prevents individual application programs (e.g. a restaurant POS system program or a Menu Board program) from being required to implement the heartbeat functionality. In embodiments, the heartbeat is a periodic (WHITE-BLACK-WHITE- . . . ) signal running at a rate of approximately 2 Hz.

For the heartbeat monitor functionality, the feedback from light sensor 202 is monitored for periodic behavior. This function is performed by the host CPU. When polled for status, this "Monitor.exe" program, it will reply with either (1) LCD GOOD; (2) LCD FAIL; or (3) BACKLIGHT OFF.

Figure 5:
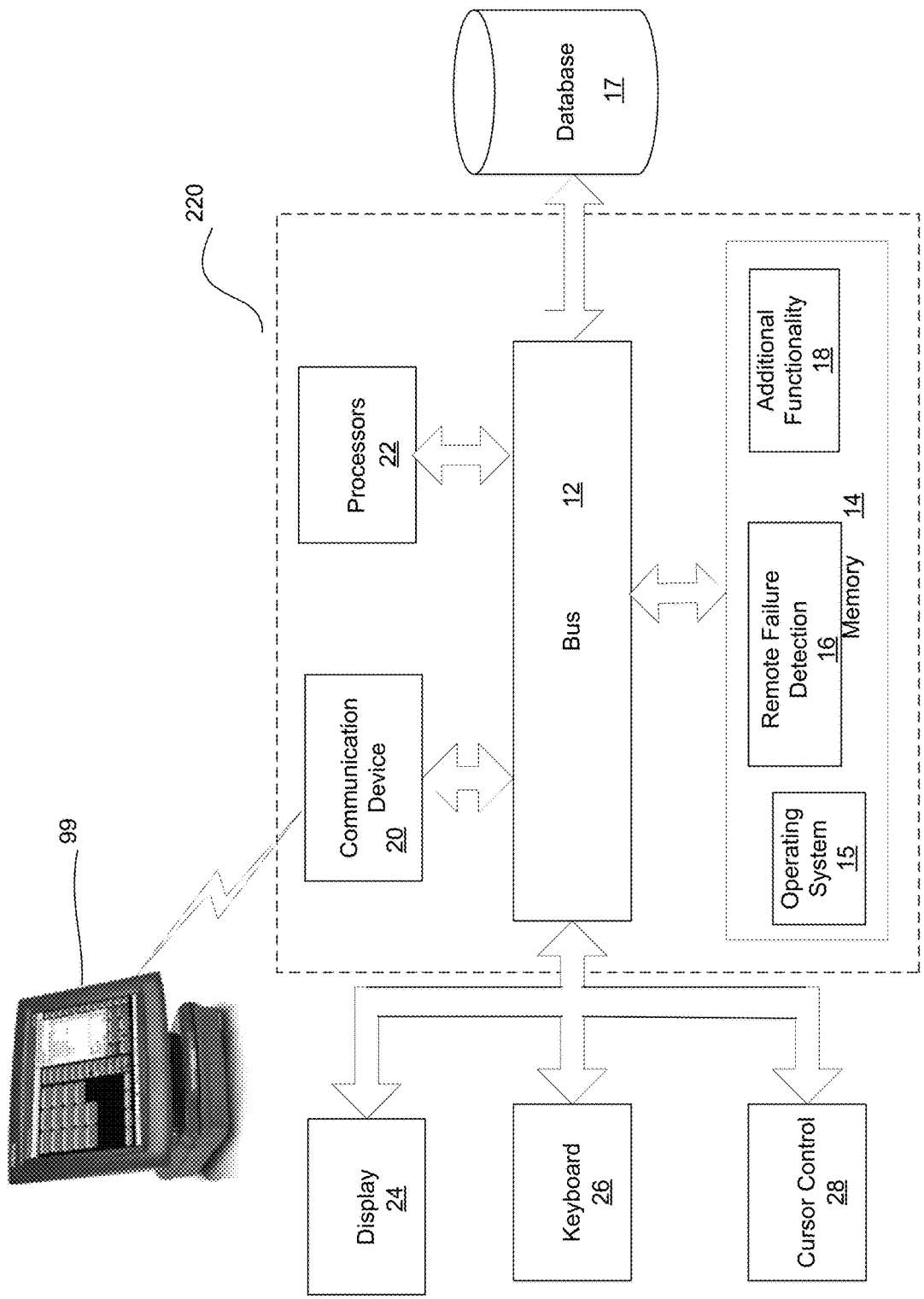
FIG. 5 is a block diagram of a computer server/system in accordance with an embodiment of the invention.

FIG. 5 is a block diagram of computer server/system 220 in accordance with an embodiment of the invention. Although shown as a single system, the functionality of system 220 can be implemented as a distributed system. Further, the functionality disclosed herein can be implemented on separate servers or devices that may be coupled together over a network. Further, one or more components of system 220 may not be included. For example, when implemented as a web server or cloud based functionality, system 220 is implemented as one or more servers, and user interfaces such as the keyboard, mouse, etc. are not needed.

System 220 includes a bus 12 or other communication mechanism for communicating information, and a processor 22 coupled to bus 12 for processing information. Processor 22 may be any type of general or specific purpose processor. System 10 further includes a memory 14 for storing information and instructions to be executed by processor 22. Memory 14 can be comprised of any combination of random access memory ("RAM"), read only memory ("ROM"), static storage such as a magnetic or optical disk, or any other type of computer readable media. System 220 further includes a communication device 20, such as a network interface card, to provide access to a network. Therefore, a user may interface with system 220 directly, or remotely through a network, or any other method.

Computer readable media may be any available media that can be accessed by processor 22 and includes both volatile and nonvolatile media, removable and non-removable media, and communication media. Communication media may include computer readable instructions, data structures, program modules, or other data in a modulated data signal such as a carrier wave or other transport mechanism, and includes any information delivery media.

Processor 22 is further coupled via bus 12 to a display 24. System 220 is further linked to display 201 via flexible PCB 210 as previously disclosed. A keyboard 26 and a cursor control device 28, such as a computer mouse, are further coupled to bus 12 to enable a user to interface with system 10. Display 22 may be different than display 201. This design can be used in full CPU systems as disclosed in conjunction with FIG. 5, or in a display-only unit (with no PC-style CPU). In the case of the latter, the heartbeat signal voltage needs to have a small micro-controller for the purposes of signal processing and transmission back to the host CPU.

In one embodiment, memory 14 stores software modules that provide functionality when executed by processor 22. The modules include an operating system 15 that provides operating system functionality for system 10. The modules further include remote failure detection module 16 that detects failures of display 201, and all other functionality disclosed herein. System 10 can be part of a larger system. Therefore, system 10 can include one or more additional functional modules 18 to include the additional functionality, such as the functionality of a Restaurant Management System (e.g., the "Oracle MICROS Restaurant POS System") or an enterprise resource planning ("ERP") system. A database 17 is coupled to bus 12 to provide centralized storage for modules 16 and 18 and store restaurant data, transactional data, etc. In one embodiment, database 17 is a relational database management system ("RDBMS") that can use Structured Query Language ("SQL") to manage the stored data. In one embodiment, a specialized point of sale ("POS") terminal 99 generates transactional data and historical sales data (e.g., data concerning transactions of restaurant customers). POS terminal 99 itself can include additional processing functionality to perform remote failure detection in accordance with one embodiment and can operate as a specialized remote failure detection system either by itself or in conjunction with other components of FIG. 5.

In one embodiment, particularly when there are a large number of restaurants, a large number of displays, or a large amount of historical data, database 17 is implemented as an in-memory database ("IMDB"). An IMDB is a database management system that primarily relies on main memory for computer data storage. It is contrasted with database management systems that employ a disk storage mechanism. Main memory databases are faster than disk-optimized databases because disk access is slower than memory access, the internal optimization algorithms are simpler and execute fewer CPU instructions. Accessing data in memory eliminates seek time when querying the data, which provides faster and more predictable performance than disk.

In one embodiment, database 17, when implemented as a IMDB, is implemented based on a distributed data grid. A distributed data grid is a system in which a collection of computer servers work together in one or more clusters to manage information and related operations, such as computations, within a distributed or clustered environment. A distributed data grid can be used to manage application objects and data that are shared across the servers. A distributed data grid provides low response time, high throughput, predictable scalability, continuous availability, and information reliability. In particular examples, distributed data grids, such as, e.g., the "Oracle Coherence" data grid from Oracle Corp., store information in-memory to achieve higher performance, and employ redundancy in keeping copies of that information synchronized across multiple servers, thus ensuring resiliency of the system and continued availability of the data in the event of failure of a server.

In one embodiment, system 10 is a computing/data processing system including an application or collection of distributed applications for enterprise organizations, and may also implement logistics, manufacturing, and inventory management functionality. The applications and computing system 10 may be configured to operate with or be implemented as a cloud-based networking system, a software-as-a-service ("SaaS") architecture, or other type of computing solution.

Figure 6:
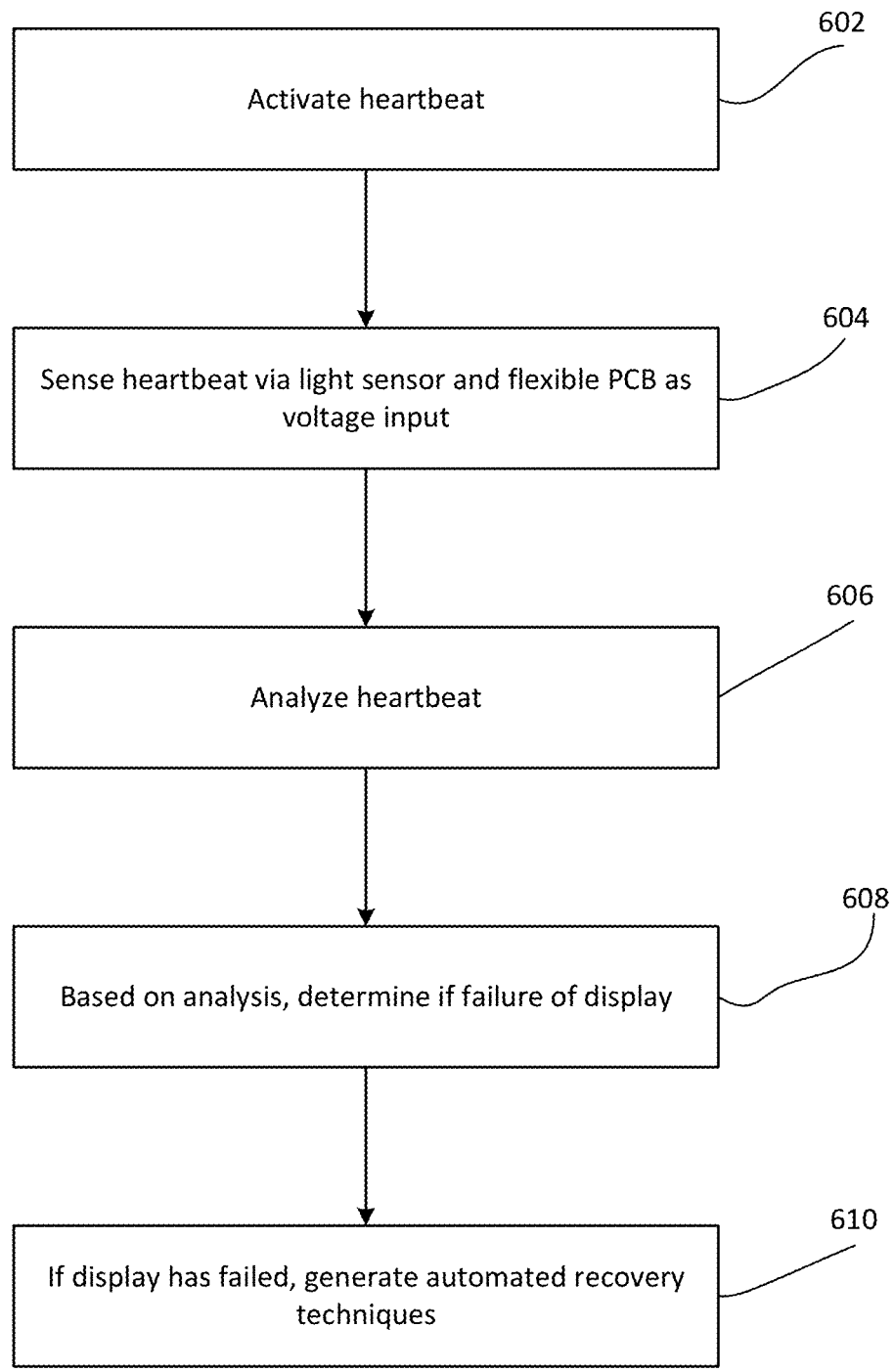
FIG. 6 is a flow diagram that illustrates the functionality of the remote failure detection module of FIG. 5 in accordance to embodiments.

FIG. 6 is a flow diagram that illustrates the functionality of remote failure detection module 16 of FIG. 5 in accordance to embodiments. In one embodiment, the functionality of the flow diagram of FIG. 6 is implemented by software stored in memory or other computer readable or tangible medium, and executed by a processor. In other embodiments, the functionality may be performed by hardware (e.g., through the use of an application specific integrated circuit ("ASIC"), a programmable gate array ("PGA"), a field programmable gate array ("FPGA"), etc.), or any combination of hardware and software.

At 602, a heartbeat is activated in an area of LCD display 201 (assuming LCD display 201 is operating correctly) covered by light sensor 202 (i.e., the heartbeat area of display 201). In one embodiment, the heartbeat is alternating white and black pixels at approximately 2 Hz. In other embodiments, other patterns or content can be used.

At 604, light sensor 202, which is coupled to server 220 via a flexible PCB 210, generates a responsive voltage input that is sent to server 220 via flexible PCB 210.

At 606, the responsive voltage input is analyzed to determine if the heartbeat is received (i.e., the heartbeat was rendered by LCD 201), or if the backlight is off. The received voltage is compared to the known driven heartbeat waveform, which is a square wave of frequency 2 Hz in this example. If that received signal is not a replica of the drive heartbeat cursor, the LCD is determined to be in a compromised condition, most likely either a backlight failure or an LCD data failure, each of which could be caused by power supply failures, connection failures, etc. Such an event flags the operator that the LCD system is in need of inspection.

At 608, based on the analysis, the state of LCD display 201 is output. The possible states in embodiments include display 201 is good (i.e., operating properly), display 201 has failed, or the backlight is off.

At 610, if the display has failed, embodiments can generate automated recovery techniques, including in a multi-display environment, automatically rolling over a failed display's data to a secondary display, or initiating a warning message to off-site support. In embodiments, other automated responses can include voltage and current detectors for the various critical voltages and currents, additional light detectors to sense if the backlighting is still functional, etc.

Figure 7:
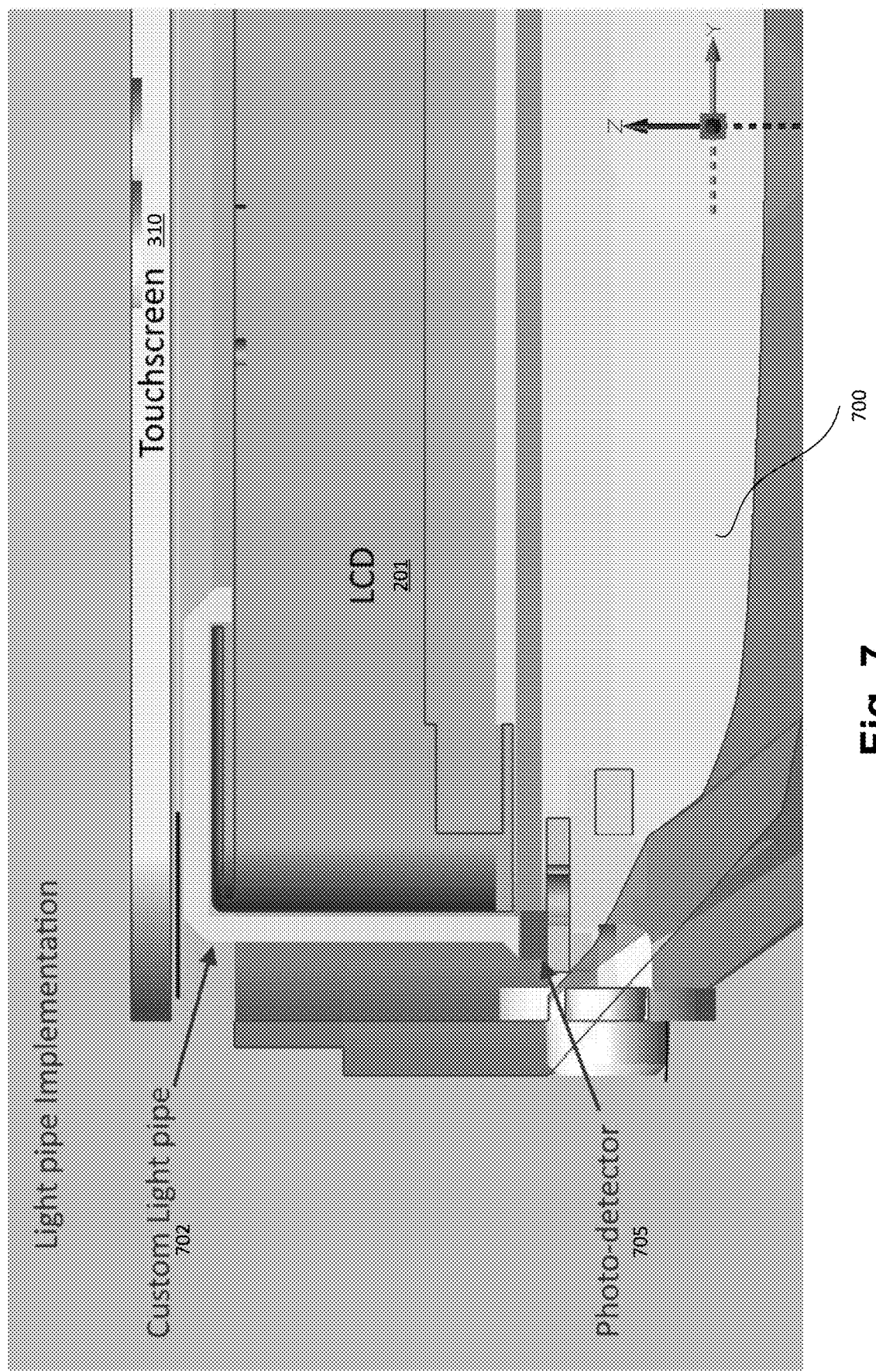
FIG. 7 is a partial view of a remote display system in accordance to embodiments of the invention.

FIG. 7 is a partial view of a remote display system 700 in accordance to embodiments of the invention. Remote display system 700 is similar to previously disclosed embodiments, except a light pipe 702 replaces light sensor 202 and flex PCB 210. Light pipe 702 provides the transmission of the heartbeat signal from LCD 201 to a light sensor 705 on a PCB board located away from the front surface of LCD 201. Because the display applications can be in challenging thermal environments (e.g., outdoors in a restaurant parking lot), a polycarbonate material is used for light pipe 702 in embodiments. Such material provides for excellent light transmission, while being suitable for higher-temp operations.

Light pipe 702 is designed to fit in the approximate same location as the flex PCB-mounted photo-detector 202 of FIG. 3A. A similar amount of pixel area is needed, so the same area would be used for the light-pipe signal pickup.

In other embodiments, fiber optics can be used instead of flex PCB 210.

As disclosed, embodiments automatically and remotely detect failures of a display using a compact design that is adapted to be used with touchscreen displays. As a result, the failure of remote displays can be detected promptly and in an automated fashion.

Several embodiments are specifically illustrated and/or described herein. However, it will be appreciated that modifications and variations of the disclosed embodiments are covered by the above teachings and within the purview of the appended claims without departing from the spirit and intended scope of the invention.

What is claimed is:

1. A remote display system comprising:
   a display that generates and displays information;
   an outer surface that forms a gap between the outer surface and the display, the outer surface located on a front side of the remote display system;
   a light sensor disposed within the gap and covering an active portion of the display, the light sensor disposed external to the display and adapted to sense an output generated by the display; and
   a flexible printed circuit board (PCB) that directly couples the light sensor to a power source and a server, wherein the flexible PCB extends from the front side to a back side of the remote display system.

2. The system of claim 1, wherein the outer surface is a touchscreen and the PCB is coupled to the light sensor between the light sensor and the outer surface.

3. The system of claim 1, wherein the server comprises a processor adapted to execute instructions to activate the output generated by the display comprising a heartbeat cursor at least within the active portion of the display.

4. The system of claim 3, wherein the heartbeat cursor comprises alternating white and black pixels at approximately 2 Hz.

5. The system of claim 3, wherein the light sensor is adapted to generate a voltage input responsive to the display.

6. The system of claim 5, the processor further adapted to analyze the voltage input to determine if the heartbeat cursor was rendered on the display.

7. The system of claim 6, the processor further adapted to determine a state of the display based on the analysis, the state comprising one of: the display is operating properly, the display has failed, or a backlight of the display is off.

8. The system of claim 7, the processor further adapted to generate an automatic recovery technique if the state is the display has failed.

9. The system of claim 1, wherein a stack height of the light sensor and the flexible PCB between the display and the outer surface is approximately 1.3-1.4 mm.

10. A method of monitoring a remote display system comprising a display that generates and displays information and an outer surface that forms a gap between the outer surface and the display, the outer surface located on a front side of the remote display system, the method comprising:
    disposing a light sensor within the gap and covering an active portion of the display, the light sensor disposed external to the display and adapted to sense an output generated by the display; and
    directly coupling, via a flexible printed circuit board (PCB), the light sensor to a power source and a server, wherein the flexible PCB extends from the front side to a back side of the remote display system to the power source.

11. The method of claim 10, wherein the outer surface is a touchscreen and the PCB is coupled to the light sensor between the light sensor and the outer surface.

12. The method of claim 10, wherein the server comprises a processor adapted to execute instructions, the method further comprising:
    activating the output generated by the display comprising a heartbeat cursor at least within the active portion of the display.

13. The method of claim 12, wherein the heartbeat cursor comprises alternating white and black pixels at approximately 2 Hz.

14. The method of claim 12, further comprising:
    generating by the light sensor a voltage input responsive to the display.

15. The method of claim 14, further comprising:
    analyzing the voltage input to determine if the heartbeat cursor was rendered on the display.

16. The method of claim 15, further comprising:
    determining a state of the display based on the analysis, the state comprising one of: the display is operating properly, the display has failed, or a backlight of the display is off.

17. The method of claim 16, further comprising:
    generating an automatic recovery technique if the state is the display has failed.

18. The method of claim 10, wherein a stack height of the light sensor and the flexible PCB between the display and the outer surface is approximately 1.3-1.4 mm.

19. A non-transitory computer readable medium having instructions stored thereon that, when executed by one or more processors, cause the processors to monitor a remote display system comprising a display that generates and displays information, an outer surface that forms a gap between the outer surface and the display, the outer surface located on a front side of the remote display system, a light sensor disposed within the gap and covering an active portion of the display, the light sensor disposed external to the display and adapted to sense an output generated by the display, and a flexible printed circuit board (PCB) that directly couples the light sensor to a power source and a server, wherein the flexible PCB extends from the front side to a back side of the remote display system, the monitoring comprising:
    activating the output generated by the display comprising a heartbeat cursor at least within the active portion of the display;
    receiving via the flexible PCB a voltage input from the light sensor that is responsive to the display;
    analyzing the voltage input to determine if the heartbeat cursor was rendered on the display.

20. The computer readable medium of claim 19, the monitoring further comprising:
    determining a state of the display based on the analysis, the state comprising one of: the display is operating properly, the display has failed, or a backlight of the display is off; and
    generating an automatic recovery technique if the state is the display has failed.

* * * * *